(12) United States Patent
Huseman et al.

(10) Patent No.: US 8,479,483 B1
(45) Date of Patent: Jul. 9, 2013

(54) FLEXIBLE DRAPER HEAD PROVIDING REDUCED CROP RESIDUE ACCUMULATION

(75) Inventors: Michael Huseman, Campbell Hill, IL (US); Brian Heath, Eldorado, IN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/337,996

(22) Filed: Dec. 27, 2011

(51) Int. Cl.
*A01D 43/00* (2006.01)

(52) U.S. Cl.
USPC .............................. 56/181; 56/208

(58) Field of Classification Search
USPC .................. 56/181, 208, 15.8, 14.5
See application file for complete search history.

(56) References Cited

U.S. PATENT DOCUMENTS

| | | | |
|---|---|---|---|
| 391,383 A | 10/1888 | Myrick | |
| 515,549 A | 2/1894 | Miller | |
| 923,084 A | 5/1909 | Simmons | |
| 1,580,646 A | 4/1926 | Brattly | |
| 1,862,101 A | 6/1932 | Pax | |
| 1,881,411 A | 10/1932 | Love et al. | |
| 1,914,837 A | 6/1933 | Thoen | |
| 1,928,236 A | 9/1933 | Thoen | |
| 1,990,054 A | 2/1935 | Theon | |
| 1,996,294 A | 4/1935 | Hume et al. | |
| 2,099,471 A | 11/1937 | Edgington | |
| 2,102,710 A * | 12/1937 | Hume et al. | 56/158 |
| 2,235,602 A | 3/1941 | Biesemeyer | |
| 2,240,066 A | 4/1941 | Bingham | |
| 2,347,365 A | 4/1944 | Paradise | |
| 2,389,193 A | 11/1945 | Graves | |
| 2,438,065 A | 3/1948 | Love | |
| 2,499,438 A | 6/1952 | Downing et al. | |
| 2,599,438 A | 6/1952 | Downing et al. | |
| 2,608,041 A | 8/1952 | Schoenrock | |
| 2,795,922 A | 6/1957 | Hume | |
| 2,912,814 A | 11/1959 | Witt et al. | |
| 2,915,870 A | 12/1959 | Hume | |
| 2,999,348 A | 9/1961 | Cunningham | |
| 3,283,485 A | 11/1966 | Koch et al. | |
| 3,304,699 A | 2/1967 | Koch et al. | |
| 3,324,639 A | 6/1967 | Halls et al. | |
| 3,349,549 A | 10/1967 | Van Der Lely | |
| 3,597,907 A | 8/1971 | Neal | |
| 3,763,637 A | 10/1973 | Schmitt | |

(Continued)

FOREIGN PATENT DOCUMENTS

| | | |
|---|---|---|
| AU | 613293 | 12/1989 |
| AU | 617821 | 1/1990 |

(Continued)

OTHER PUBLICATIONS

AGCO, Hesston 8200 Windrower Diagram (dated 1991).

(Continued)

*Primary Examiner* — Árpád Fábián-Kovács
(74) *Attorney, Agent, or Firm* — Hovey Williams LLP (57) ABSTRACT

A harvesting header includes a header frame, a flexible cutterbar assembly, and a draper assembly. The cutterbar assembly is mounted to the header frame and includes a plurality of skids. The draper assembly includes a draper belt with upper and lower runs, and a run support panel is provided below the lower run. The run support panel is spaced from the skids to define a residue opening therebetween through which any crop residue falling onto the skids is permitted to pass.

20 Claims, 10 Drawing Sheets

U.S. PATENT DOCUMENTS

| | | | |
|---|---|---|---|
| 3,783,594 A | 1/1974 | Watt et al. |
| 3,813,859 A | 6/1974 | Fuller et al. |
| 3,851,451 A | 12/1974 | Agness et al. |
| 3,866,400 A | 2/1975 | May |
| 3,866,718 A | 2/1975 | Hiergeist |
| 3,885,377 A | 5/1975 | Jones |
| 3,886,718 A | 6/1975 | Talbot |
| 3,941,003 A | 3/1976 | Garrison et al. |
| 3,953,959 A | 5/1976 | Decruyenaere |
| 3,967,439 A | 7/1976 | Mott |
| 3,982,383 A | 9/1976 | Mott |
| 4,008,556 A | 2/1977 | Wegscheid et al. |
| 4,011,709 A | 3/1977 | Mott et al. |
| 4,091,602 A | 5/1978 | Williams et al. |
| 4,124,970 A | 11/1978 | Bernhardt |
| 4,171,606 A | 10/1979 | Ziegler et al. |
| 4,191,006 A | 3/1980 | Kerber et al. |
| 4,195,467 A | 4/1980 | Lawrence et al. |
| 4,198,803 A | 4/1980 | Quick et al. |
| 4,199,925 A | 4/1980 | Quick et al. |
| 4,206,582 A | 6/1980 | Molzahn et al. |
| 4,206,583 A | 6/1980 | Week et al. |
| 4,206,584 A | 6/1980 | Johnson et al. |
| 4,211,057 A | 7/1980 | Dougherty et al. |
| 4,216,641 A | 8/1980 | Koch et al. |
| 4,227,363 A | 10/1980 | Kerber et al. |
| 4,246,742 A | 1/1981 | Clark et al. |
| 4,253,295 A | 3/1981 | Knepper |
| 4,266,391 A | 5/1981 | McDuffie et al. |
| 4,266,392 A | 5/1981 | Knepper et al. |
| 4,296,592 A | 10/1981 | McIlwain |
| 4,307,560 A | 12/1981 | Swanson |
| 4,330,983 A | 5/1982 | Moore |
| 4,330,984 A | 5/1982 | Hillmann |
| 4,332,126 A | 6/1982 | Van Auwelaer et al. |
| 4,372,103 A | 2/1983 | McIlwain et al. |
| 4,407,110 A | 10/1983 | McIlwain et al. |
| 4,409,778 A | 10/1983 | McNaught |
| 4,409,780 A | 10/1983 | Beougher et al. |
| 4,414,793 A | 11/1983 | Halls |
| 4,429,517 A | 2/1984 | Lohrentz et al. |
| 4,441,307 A | 4/1984 | Enzmann |
| 4,446,683 A | 5/1984 | Rempel et al. |
| 4,473,993 A | 10/1984 | Jennings et al. |
| 4,493,181 A | 1/1985 | Glendenning et al. |
| 4,538,404 A | 9/1985 | Heimark, Jr. et al. |
| 4,541,229 A | 9/1985 | Elijah |
| 4,553,379 A | 11/1985 | Kalverkamp |
| 4,573,308 A | 3/1986 | Ehrecke et al. |
| 4,599,852 A | 7/1986 | Kerber et al. |
| 4,627,226 A | 12/1986 | De Coene |
| 4,660,360 A | 4/1987 | Hardesty et al. |
| 4,665,685 A | 5/1987 | Rupprecht |
| 4,674,626 A | 6/1987 | Adcock |
| 4,700,537 A | 10/1987 | Emmert |
| 4,722,172 A | 2/1988 | Pearce |
| 4,724,661 A | 2/1988 | Blakeslee et al. |
| 4,733,523 A | 3/1988 | Dedeyne et al. |
| 4,757,673 A | 7/1988 | Gayman |
| 4,776,153 A | 10/1988 | DePauw et al. |
| 4,813,296 A | 3/1989 | Guinn |
| 4,815,265 A | 3/1989 | Guinn et al. |
| 4,835,954 A | 6/1989 | Enzmann |
| 4,845,931 A | 7/1989 | Bruner et al. |
| 4,863,419 A | 9/1989 | Sansone |
| 4,875,331 A | 10/1989 | Ostrup et al. |
| 4,891,932 A | 1/1990 | Johnson |
| 4,909,025 A | 3/1990 | Reissig et al. |
| 4,923,014 A | 5/1990 | Mijnders |
| 4,942,724 A | 7/1990 | Diekhans et al. |
| 4,956,966 A | 9/1990 | Patterson |
| 5,005,343 A | 4/1991 | Patterson |
| 5,157,905 A | 10/1992 | Talbot et al. |
| 5,243,810 A | 9/1993 | Fox et al. |
| 5,459,986 A | 10/1995 | Talbot et al. |
| 5,464,371 A | 11/1995 | Honey |
| RE35,543 E | 7/1997 | Patterson |
| 5,661,964 A | 9/1997 | Paulson et al. |
| 5,711,140 A | 1/1998 | Burmann |
| 5,791,128 A | 8/1998 | Rogalsky |
| 5,845,472 A | 12/1998 | Arnold |
| 5,865,019 A | 2/1999 | Hurlburt et al. |
| 5,924,270 A | 7/1999 | Bruns |
| 6,029,429 A | 2/2000 | Fox et al. |
| 6,070,401 A | 6/2000 | Johnson |
| 6,116,010 A | 9/2000 | Salley |
| 6,202,397 B1 | 3/2001 | Watts et al. |
| 6,247,297 B1 | 6/2001 | Becker |
| 6,305,154 B1 | 10/2001 | Yang et al. |
| 6,351,931 B1 | 3/2002 | Shearer |
| 6,510,681 B2 | 1/2003 | Yang et al. |
| 6,588,187 B2 | 7/2003 | Engelstad et al. |
| 6,663,525 B1 | 12/2003 | McKee et al. |
| 6,666,007 B2 | 12/2003 | Schroeder |
| 6,675,568 B2 | 1/2004 | Patterson et al. |
| 6,705,067 B2 | 3/2004 | Schroeder et al. |
| 6,758,029 B2 | 7/2004 | Beaujot |
| 6,782,683 B2 | 8/2004 | Buermann |
| 6,817,166 B2 | 11/2004 | Dunn |
| 6,826,894 B2 | 12/2004 | Thiemann et al. |
| 6,865,871 B2 | 3/2005 | Hosel |
| 6,889,492 B1 | 5/2005 | Polk et al. |
| 7,121,074 B1 | 10/2006 | Regier et al. |
| 7,159,378 B2 | 1/2007 | Rickert |
| 7,162,855 B2 | 1/2007 | Boeckmann et al. |
| 7,191,582 B2 | 3/2007 | Bomleny |
| 7,197,865 B1 | 4/2007 | Enns et al. |
| 7,207,164 B2 | 4/2007 | Bomleny |
| 7,222,474 B2 | 5/2007 | Rayfield et al. |
| 7,222,475 B2 | 5/2007 | Bomleny et al. |
| 7,350,345 B2 | 4/2008 | Slabbinck et al. |
| 7,373,769 B2 | 5/2008 | Talbot et al. |
| 7,380,392 B2 | 6/2008 | Willem et al. |
| 7,395,651 B2 | 7/2008 | Kost et al. |
| 7,401,458 B2 | 7/2008 | Priepke |
| 7,412,816 B2 | 8/2008 | Coers et al. |
| 7,426,817 B2 | 9/2008 | Coers |
| 7,430,846 B2 | 10/2008 | Bomleny et al. |
| 7,444,798 B2 | 11/2008 | Patterson et al. |
| 7,467,506 B2 | 12/2008 | Lovett et al. |
| 7,472,533 B2 | 1/2009 | Talbot et al. |
| 7,478,521 B2 * | 1/2009 | Coers et al. ............ 56/208 |
| 7,478,522 B1 | 1/2009 | Lovett et al. |
| 7,520,115 B2 | 4/2009 | Coers et al. |
| 7,540,130 B2 | 6/2009 | Coers et al. |
| 7,543,428 B1 | 6/2009 | Puryk et al. |
| 7,549,280 B2 | 6/2009 | Lovett et al. |
| 7,640,720 B1 | 1/2010 | Lovett et al. |
| 7,802,417 B2 | 9/2010 | Sauerwein et al. |
| 7,827,775 B2 | 11/2010 | Sethi |
| 7,877,976 B2 | 2/2011 | Honas et al. |
| 7,913,481 B2 | 3/2011 | Sauerwein |
| 7,937,920 B2 | 5/2011 | Schmidt et al. |
| 7,975,462 B1 | 7/2011 | Figgins |
| 8,061,115 B2 | 11/2011 | Honas et al. |
| 8,191,345 B2 | 6/2012 | Honas et al. |
| 8,205,421 B2 * | 6/2012 | Sauerwein et al. ......... 56/181 |
| 2003/0010010 A1 | 1/2003 | Buermann |
| 2003/0074876 A1 | 4/2003 | Patterson et al. |
| 2004/0065069 A1 | 4/2004 | Dunn et al. |
| 2004/0163374 A1 | 8/2004 | Rickert |
| 2005/0016147 A1 | 1/2005 | Patterson et al. |
| 2007/0193243 A1 | 8/2007 | Schmidt et al. |
| 2007/0204582 A1 | 9/2007 | Coers et al. |
| 2007/0204583 A1 | 9/2007 | Coers |
| 2007/0204584 A1 | 9/2007 | Coers et al. |
| 2007/0204585 A1 | 9/2007 | Lovett et al. |
| 2007/0204586 A1 | 9/2007 | Coers |
| 2007/0204589 A1 * | 9/2007 | Coers et al. ............ 56/208 |
| 2007/0251202 A1 | 11/2007 | Coers et al. |
| 2007/0283673 A1 | 12/2007 | Coers et al. |
| 2007/0289278 A1 | 12/2007 | Coers et al. |
| 2008/0022646 A1 | 1/2008 | Patterson et al. |
| 2008/0072560 A1 | 3/2008 | Talbot |
| 2008/0078155 A1 | 4/2008 | Coers et al. |
| 2008/0092508 A1 * | 4/2008 | Talbot et al. ............ 56/181 |
| 2008/0098705 A1 | 5/2008 | Salley et al. |

| | | | |
|---|---|---|---|
| 2008/0161077 | A1 | 7/2008 | Honey |
| 2008/0271426 | A1 | 11/2008 | Lohrentz et al. |
| 2008/0276590 | A1 | 11/2008 | Sauerwein et al. |
| 2009/0007533 | A1* | 1/2009 | Lovett et al. ........... 56/14.5 |
| 2009/0007534 | A1 | 1/2009 | Sauerwein et al. |
| 2009/0084080 | A1* | 4/2009 | Coers et al. ........... 56/15.8 |
| 2009/0094957 | A1 | 4/2009 | Schmidt et al. |
| 2009/0107094 | A1 | 4/2009 | Bich et al. |
| 2009/0266044 | A1* | 10/2009 | Coers et al. ........... 56/208 |
| 2009/0277144 | A1 | 11/2009 | Honas et al. |
| 2009/0277145 | A1 | 11/2009 | Sauerwein |
| 2009/0277146 | A1 | 11/2009 | Sauerwein et al. |
| 2009/0277147 | A1 | 11/2009 | Honas et al. |
| 2009/0277148 | A1 | 11/2009 | Sethi |
| 2009/0288383 | A1 | 11/2009 | Sauerwein et al. |
| 2009/0293441 | A1 | 12/2009 | Sauerwein |
| 2010/0043373 | A1 | 2/2010 | Lohrentz et al. |
| 2010/0043375 | A1* | 2/2010 | Schmidt et al. ........... 56/181 |
| 2010/0095646 | A1* | 4/2010 | Schmidt et al. ........... 56/14.3 |
| 2010/0269472 | A1 | 10/2010 | Coers et al. |
| 2010/0313540 | A1 | 12/2010 | Sauerwein et al. |
| 2011/0154794 | A1* | 6/2011 | Coers et al. ........... 56/181 |
| 2011/0232252 | A1* | 9/2011 | Sauerwein et al. ........... 56/181 |

FOREIGN PATENT DOCUMENTS

| | | |
|---|---|---|
| AU | 615149 | 11/1990 |
| AU | 627677 | 8/1991 |
| AU | 657126 | 10/1992 |
| AU | 771097 | 11/2001 |
| AU | 2000256968 | 1/2002 |
| AU | 780865 | 1/2003 |
| AU | 2002257470 | 1/2003 |
| AU | 2002301630 | 6/2003 |
| AU | 2003204399 | 6/2003 |
| AU | 2004203614 | 2/2005 |
| AU | 2005227401 | 8/2006 |
| AU | 2006207881 | 10/2006 |
| AU | 2006201952 | 11/2006 |
| AU | 2006201953 | 11/2006 |
| AU | 2006201954 | 11/2006 |
| AU | 2007203263 | 1/2008 |
| CA | 887374 | 12/1971 |
| CA | 1052105 | 4/1979 |
| CA | 1055322 | 5/1979 |
| CA | 1056162 | 6/1979 |
| CA | 1079984 | 6/1980 |
| CA | 1081474 | 7/1980 |
| CA | 1160326 | 1/1984 |
| CA | 1163098 | 3/1984 |
| CA | 1204599 | 5/1986 |
| CA | 1238194 | 6/1988 |
| CA | 1267539 | 4/1990 |
| CA | 1274697 | 10/1990 |
| CA | 2307173 | 3/2001 |
| CA | 2307176 | 10/2001 |
| CA | 2387898 | 12/2002 |
| DE | 3512619 | 10/1986 |
| DE | 102006043314 | 10/2007 |
| EP | 0331893 | 9/1989 |
| EP | 0717922 | 6/1996 |
| EP | 0848898 | 6/1998 |
| EP | 1629707 | 3/2006 |
| EP | 1867228 | 12/2007 |
| GB | 314315 | 3/1928 |
| GB | 746108 | 3/1956 |
| GB | 777590 | 6/1957 |
| GB | 825842 | 12/1959 |
| GB | 2208581 | 12/1989 |
| SU | 445392 | 5/1975 |
| WO | 8700393 | 1/1987 |
| WO | 0219793 | 3/2002 |
| WO | 2005055699 | 6/2005 |
| WO | 2006133116 | 12/2006 |
| WO | 2007095430 | 8/2007 |

OTHER PUBLICATIONS

AGCO, Hesston 8200 Windrower Operations Manual (dated 1986).
American Society of Agricultural Engineers, "Advances in Grain Header Developments", Paper No. 77-1547 (Dec. 1977).
American Society of Agricultural Engineers, "Automatic Header Height Control for Pull Type Combine Harvesters", Paper No. 77-1548 (1977).
Deere Launches Lots of New Stuff, SAE Off-Highway Engineering Online, Apr. 2004, at 28, at http://www.sae.org/ohmag/original_eq/04-2004/.
Doug Rich, "John Deere Introduces 60 Series", High Plains Journal, Mar. 23, 2004, available at http://www.hpj.com/archives/2004/mar04/JohnDeereintroduces60Series.cfm.
International Search Report and Written Opinion from PCT Serial No. PCT/IB2009/005515 (dated Sep. 9, 2009).
International Search Report and Written Opinion from PCT Serial No. PCT/IB2009/005517 (dated Sep. 9, 2009).
International Search Report and Written Opinion from PCT Serial No. PCT/IB2009/005518 (dated Aug. 27, 2009).
International Search Report and Written Opinion from PCT Serial No. PCT/IB2009/005520 (dated Sep. 7, 2009).
International Search Report and Written Opinion from PCT Serial No. PCT/IB2009/005528 (dated Sep. 8, 2009).
International Search Report and Written Opinion from PCT Serial No. PCT/IB2009/005531 (dated Sep. 17, 2009).
International Search Report and Written Opinion from PCT Serial No. PCT/IB2009/005533 (dated Sep. 17, 2009).
International Search Report and Written Opinion from PCT Serial No. PCT/IB2009/005538 (dated Sep. 4, 2009).
International Search Report and Written Opinion from PCT Serial No. PCT/IB2009/005545 (dated Sep. 7, 2009).
John Deere, "9660 STS and 9760 STS Combines", (Copyright dated 2003) available at http://manuals.deere.com/omview/OMH208557_19.htm.
John Deere, Agriculture—640D Draper (copyright dated 1996-2009) at http://www.deere.com/servlet/ProdCatProduct?tM=FR&pNbr=0640DH.
John Deere, All-New 60 Series Combines (dated 2003).
John Deere, Combine/Platform/Head Model Year Changes: 1990-Present (downloaded Feb. 22, 2010) at http://www.deere.com/.
John Deere, "John Deere—Parts Catalog—600 R & F Cutting Platforms (North American)—FLOAT ARM" (downloaded Sep. 28, 2009) at http://jdpc.deere.com/.
John Deere, "John Deere—Parts Catalog—600 R7 F Cutting Platforms (North American)" (downloaded Sep. 25, 2009) at http://jdpc.deere.com/.
John Deere, "John Deere—Parts Catalog—635D Advanced Draper Platform" (downloaded Sep. 25, 2009) at http://jdpc.deere.com/.
John Deere, "New Equipment Combines and Headers—600 Series Hyrdraflex Platforms" (copyright dated 1996-2003) at http://web.archive.org/web/20032004004539/www.deere.com/en_US/Product Catalog/.
John Deere, "New Ten Series Combines" (dated 1997).
John Deere, "Operator's Manual—600 Series Cutting Platforms", pp. 1-47 (copyright dated 2008; various pages dated prior to 2008).
John Deere, "Operator's Manual—600 Series Cutting Platforms", pp. 48-97 (Copyright dated 2008, various pages dated prior to 2008).
MacDon, Inc., "FD70 FlexDraper Header" (copyright dated 2007) at http://www.macdon.com/product.php?model=fd70&page=details-01.
MacDon, Inc., "MacDon Flex and Rigid Draper Headers for Combines" (dated Feb. 2008) available at http://www.macdon.com/product.php?model=fd70&page=details-01.
"New John Deere Flex Draper??", Combine Talk Forums, (printed Jul. 8, 2008; blog entries dated prior to 2008) available at http://combineforums.proboards42.com/.
Photographs for John Deere 925D Header (photographs taken Nov. 9, 2007).
"The Honey Bee Story", High Plains Journal (dated Jun. 21, 2006) available at http://www.hpj.com/archives/2006/jun06/TheHoneyBeestory.cfm.
Thomas Fredickson, "Intuitive IC Op Amps", 178-179 (National Semiconductor Corp) (1984).

* cited by examiner

FLEXIBLE DRAPER HEAD PROVIDING REDUCED CROP RESIDUE ACCUMULATION

BACKGROUND

1. Field

The present invention relates generally to a harvesting header. More specifically, embodiments of the present invention concern a harvesting header with a flexible cutterbar and a draper conveyor.

2. Discussion of Prior Art

A traditional grain harvesting implement or machine, such as a self-propelled combine, is used to harvest a variety of grains, such as wheat, soybeans, and rice. Combines typically include a harvesting header that cuts the crop and gathers the crop material into a feeder house for threshing and other operations. For some grains, such as wheat, the sickle of the header can be spaced from the ground during the cutting operation. For other grains, the sickle must be positioned close to the ground, often with the header in sliding contact with the ground, in order to collect most of the grain. Flexible headers are used to follow the natural contours of the field while cutting the grain.

Turning to FIGS. 1-5, a prior art harvesting header H is depicted and includes a header frame F, with draper arm assemblies DA and end tilt arm assemblies E pivotally secured to the frame F. The assemblies DA and E support cutterbar assembly C. The cutterbar assembly C includes a flexible cutterbar B and skids S carried on the forward ends of the assemblies DA and E. The header H also broadly includes a draper assembly A with side drapers SD and center draper CD. The header H includes a lower belt support assembly L. Additional details of the prior art header are disclosed in U.S. Pat. No. 7,836,671, issued Nov. 23, 2010, entitled FLEXIBLE DRAPER AND CUTTER BAR WITH TILT ARM FOR CUTTERBAR DRIVE, which is hereby incorporated in its entirety by reference herein.

Prior art crop harvesting headers suffer from various limitations. For example, it has been found that the illustrated header H tends to become clogged with crop residue in ways that adversely affect header operation. For instance, the area below the leading edge of side drapers SD and above the belt support assembly L tends to collect crop residue from the drapers until the crop residue interferes with smooth draper belt movement. This residue can also migrate into the area between the belt runs, which is problematic. In particular, such excessive residue collection can cause binding of the belt and can restrict belt rotation.

SUMMARY

The following brief summary is provided to indicate the nature of the subject matter disclosed herein. While certain aspects of the present invention are described below, the summary is not intended to limit the scope of the present invention.

Embodiments of the present invention provide a harvesting header that does not suffer from the problems and limitations of the prior art harvesting header set forth above.

A first aspect of the present invention concerns a harvesting header operable to harvest crop. The harvesting header includes a header frame, a flexible cutterbar assembly, and a draper assembly. The flexible cutterbar assembly is mounted to the header frame to extend lengthwise in a lateral direction relative to the normal direction of travel of the header. The cutterbar assembly includes a plurality of skids configured to engage the ground and thereby cause flexing of the cutterbar assembly along the length thereof in response to changes in terrain as the header is advanced. The draper assembly includes an endless flexible draper belt configured to receive severed crop materials from the cutterbar assembly and convey the materials laterally. The draper belt presents laterally endmost margins, with upper and lower runs extending between the margins. A lower run support assembly is located below the lower run of the draper belt and at least partly over the skids. The lower run support assembly includes a run support panel extending laterally along the lower run. The run support panel is spaced from the skids to define a residue opening therebetween through which any crop residue falling onto the skids is permitted to pass.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
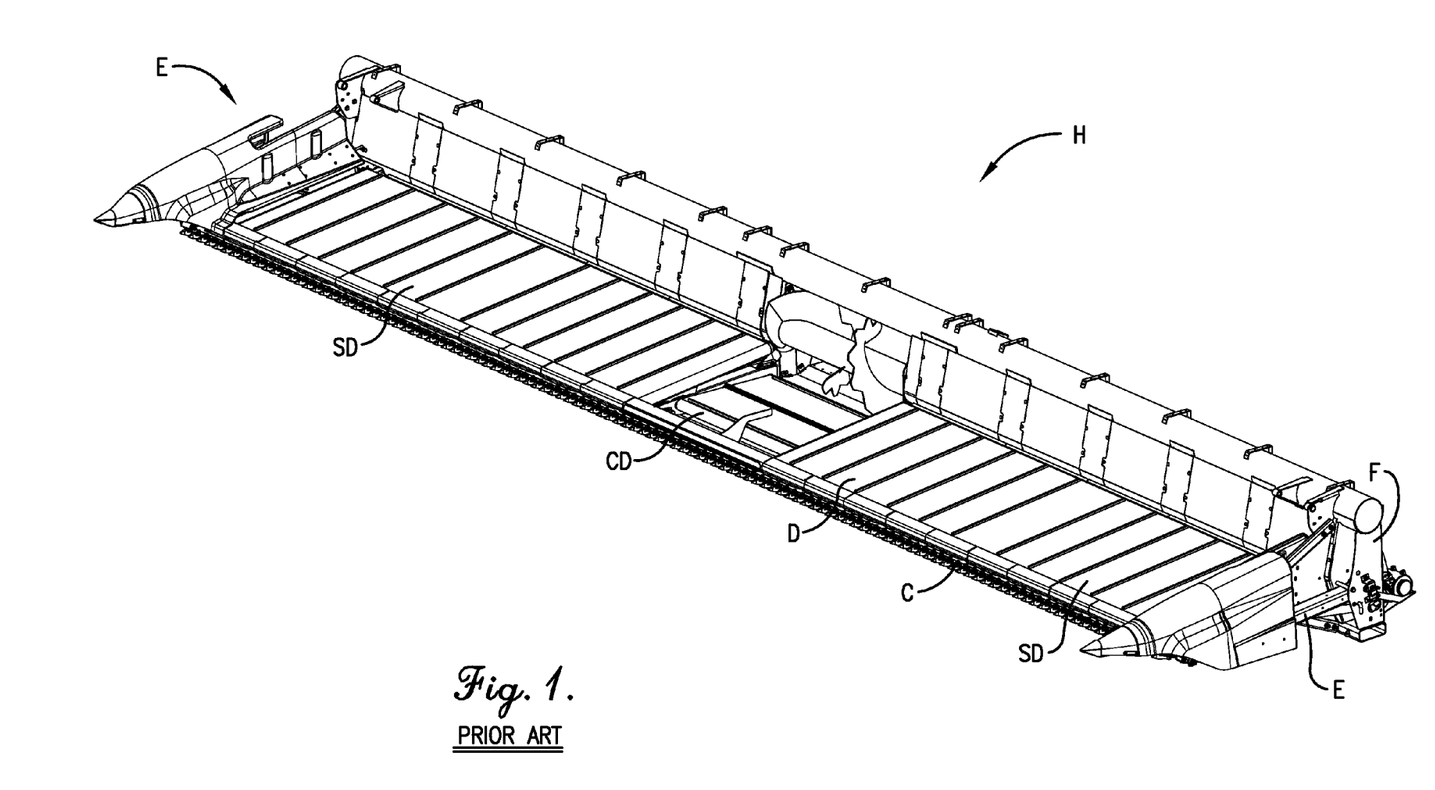
FIG. 1 is a front perspective of a prior art harvesting header.
Figure 2:
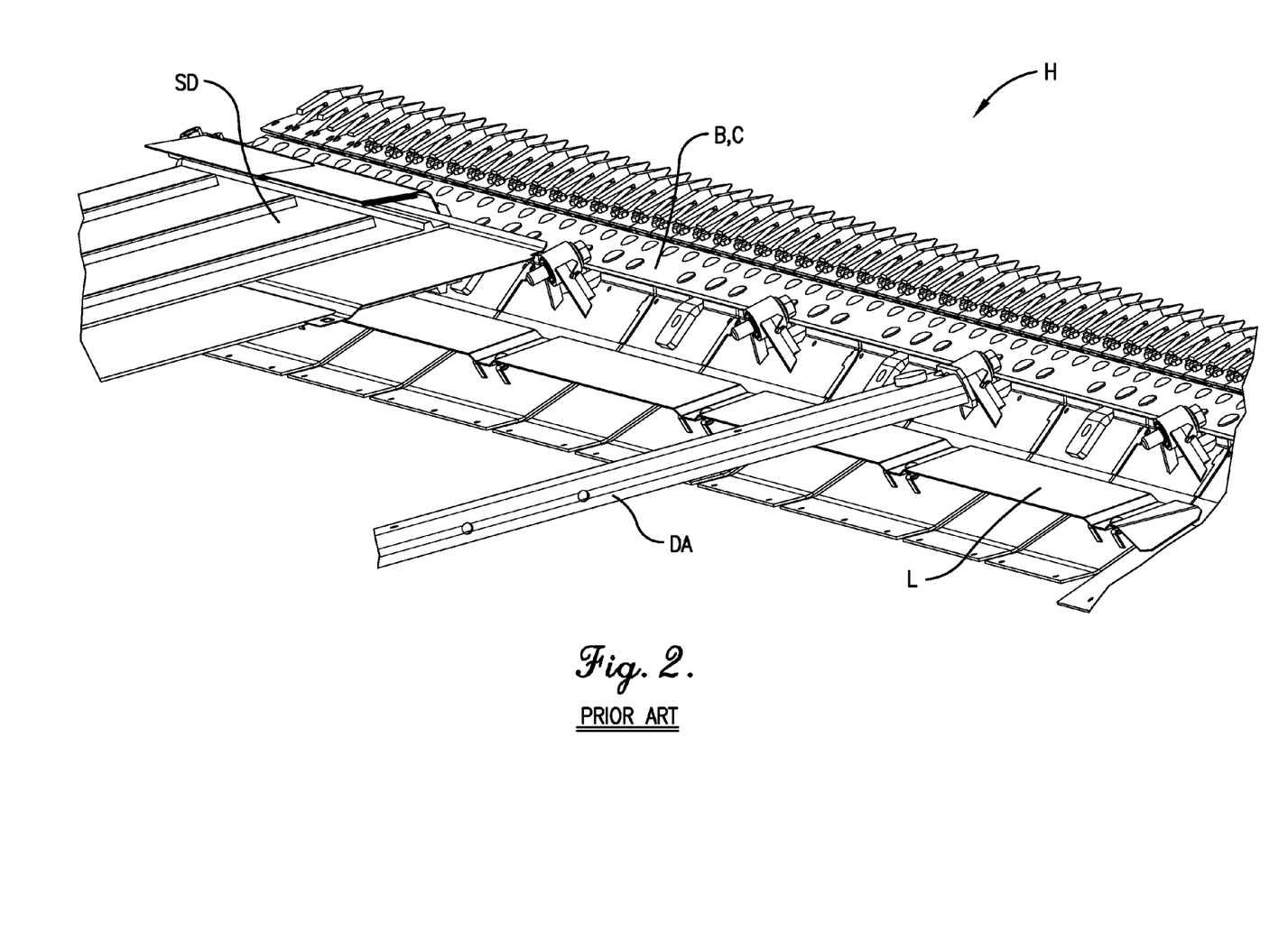
FIG. 2 is a fragmentary rear perspective of the prior art harvesting header shown in FIG. 1, showing the cutterbar assembly and side draper.
Figure 3:
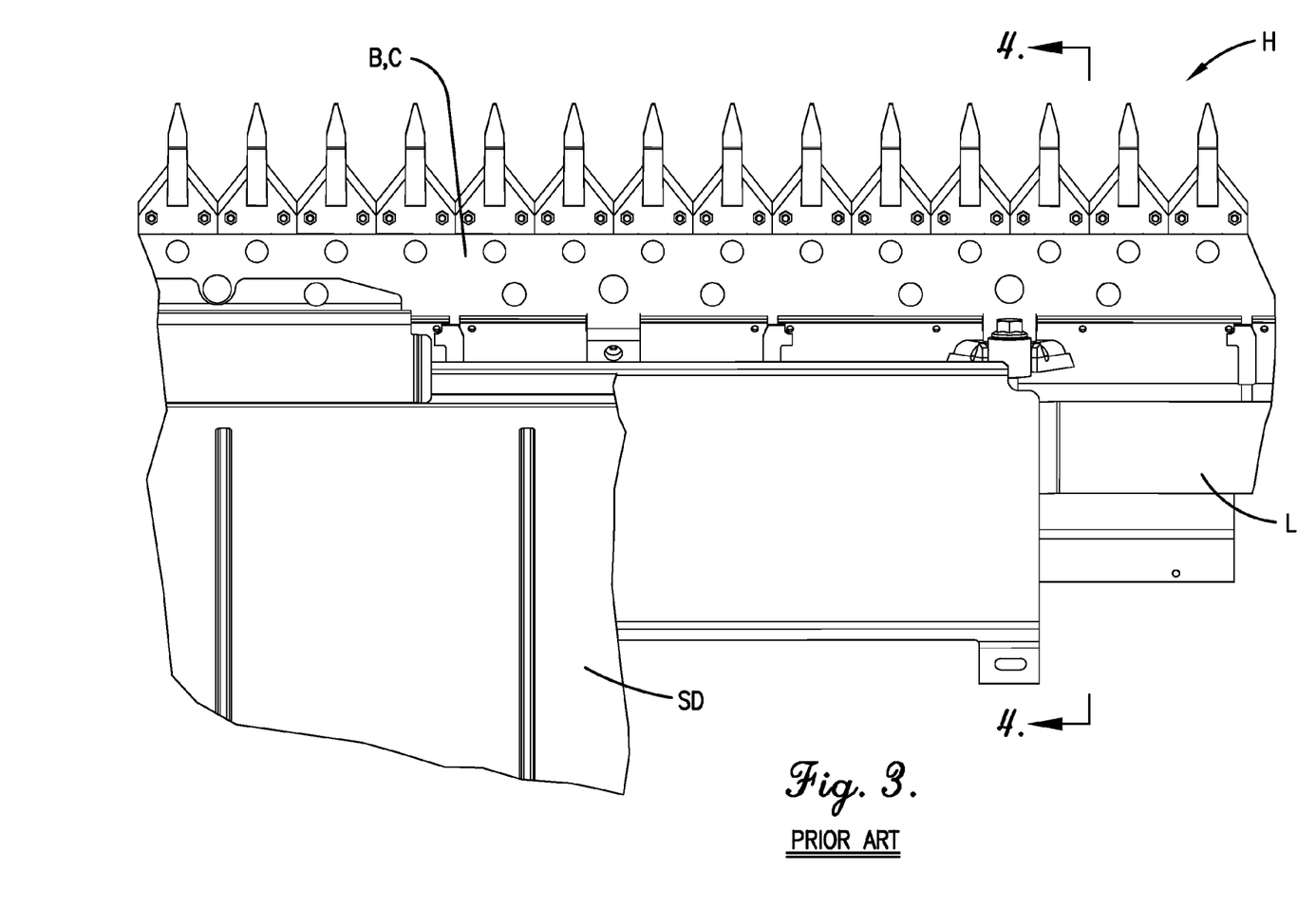
FIG. 3 is a fragmentary top view of the prior art harvesting header shown in FIGS. 1 and 2.
Figure 4:
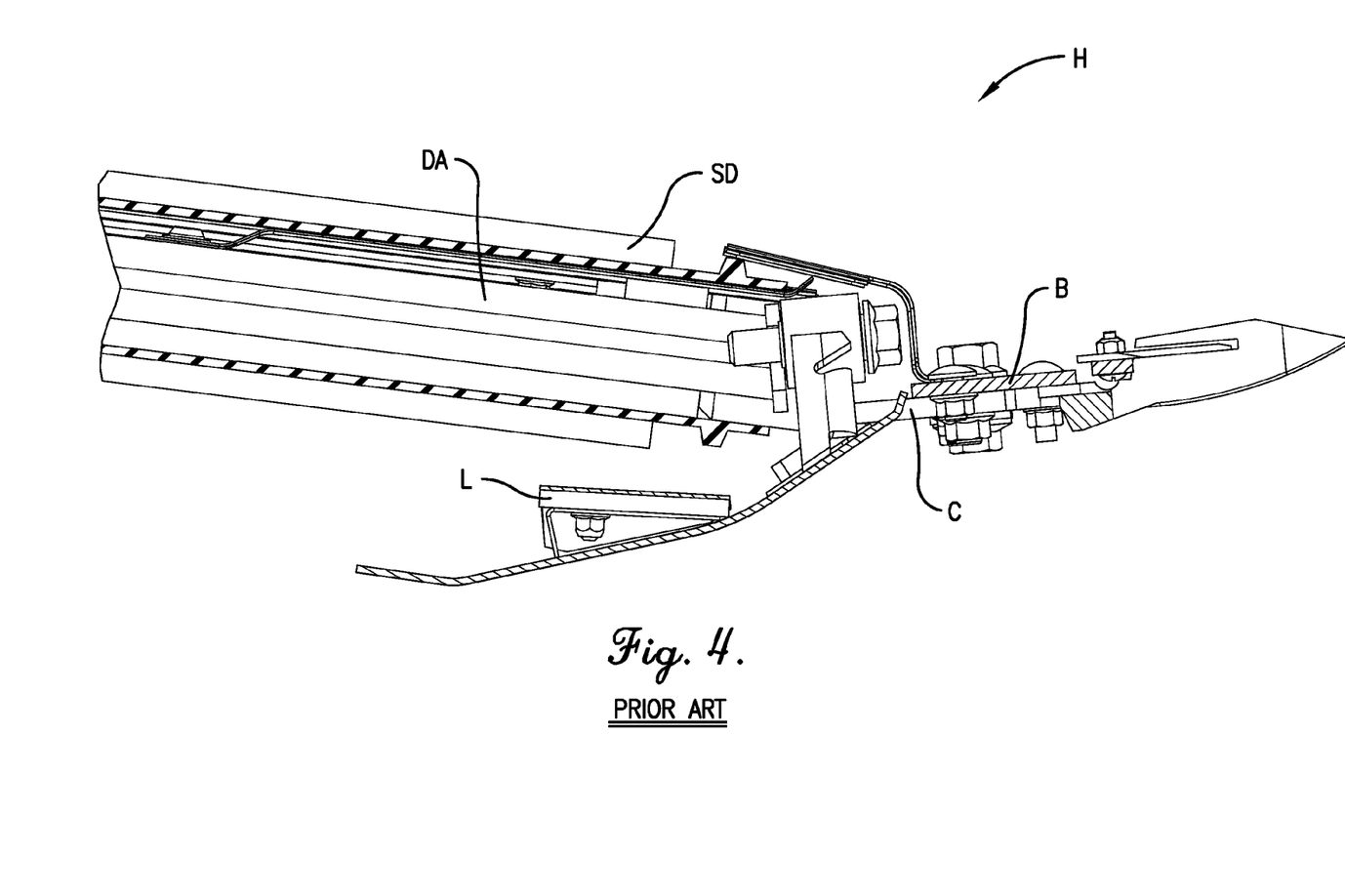
FIG. 4 is a fragmentary side elevation of the prior art harvesting header shown in FIGS. 1-3, with the header being cross-sectioned to show the side draper and cutterbar assembly.
Figure 5:
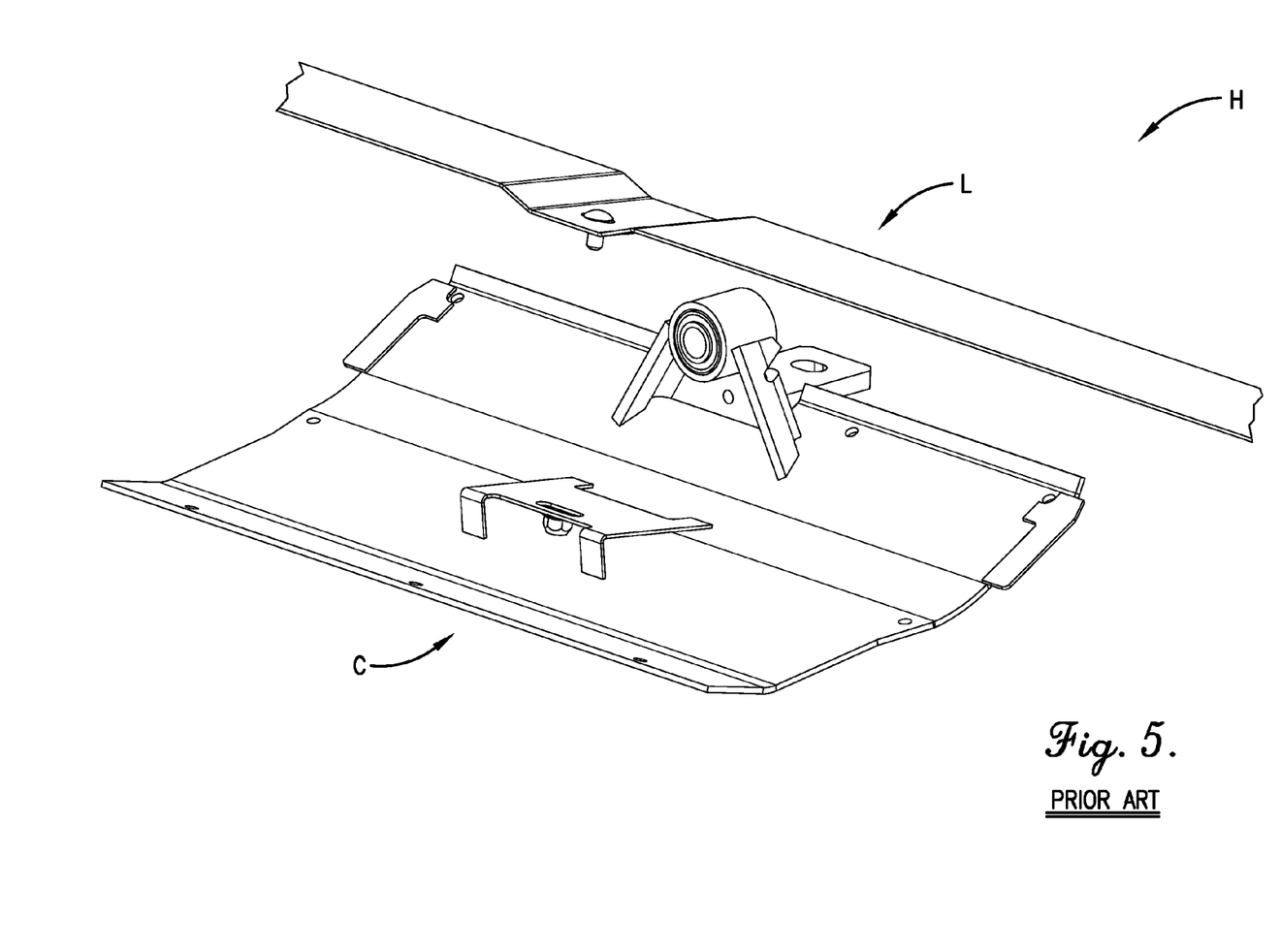
FIG. 5 is a fragmentary rear perspective of the prior art harvesting header shown in FIGS. 1-4, showing a skid of the cutterbar assembly and a belt support panel.
Figure 6:
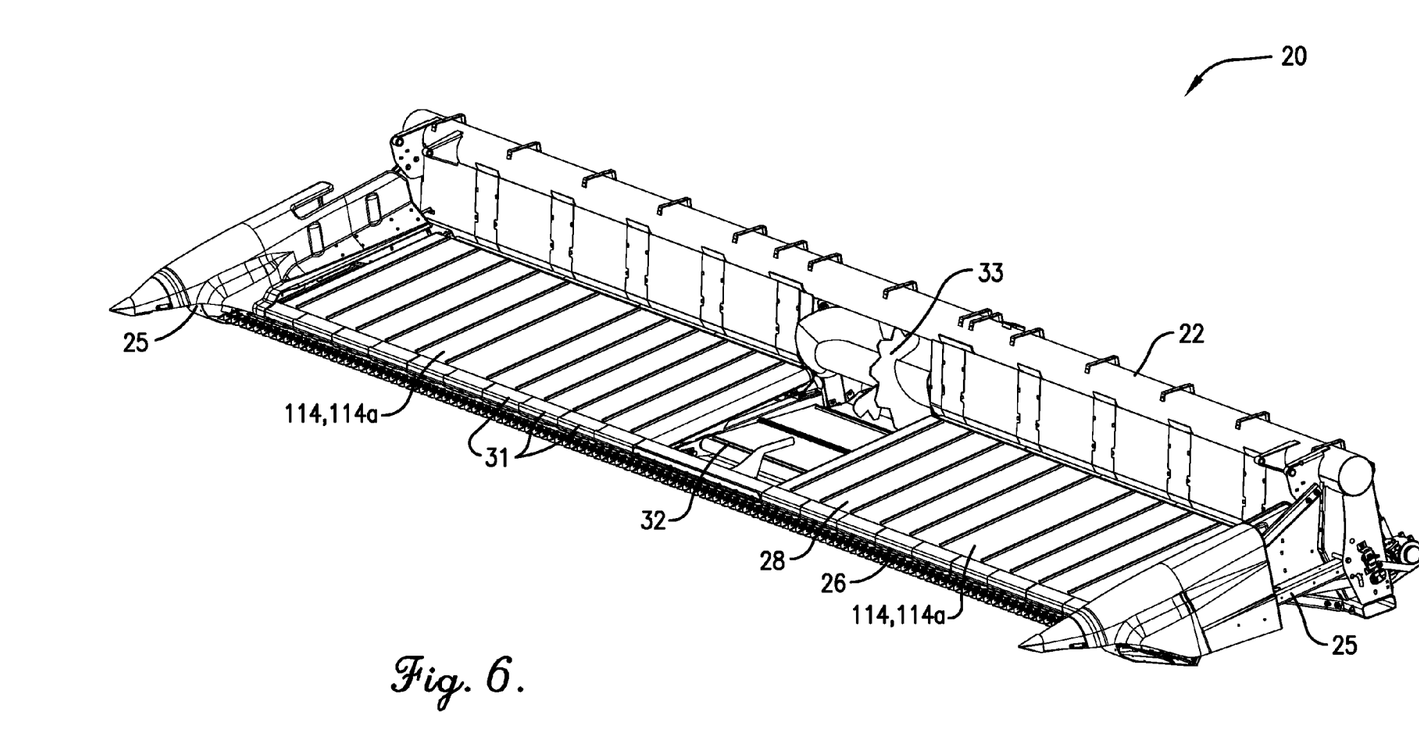
FIG. 6 is a front perspective of a harvesting header constructed in accordance with a preferred embodiment of the present invention, with the header including a header frame, draper arm assemblies, end tilt arm assemblies, a cutterbar assembly, a draper assembly, and a belt guard assembly.
Figure 7:
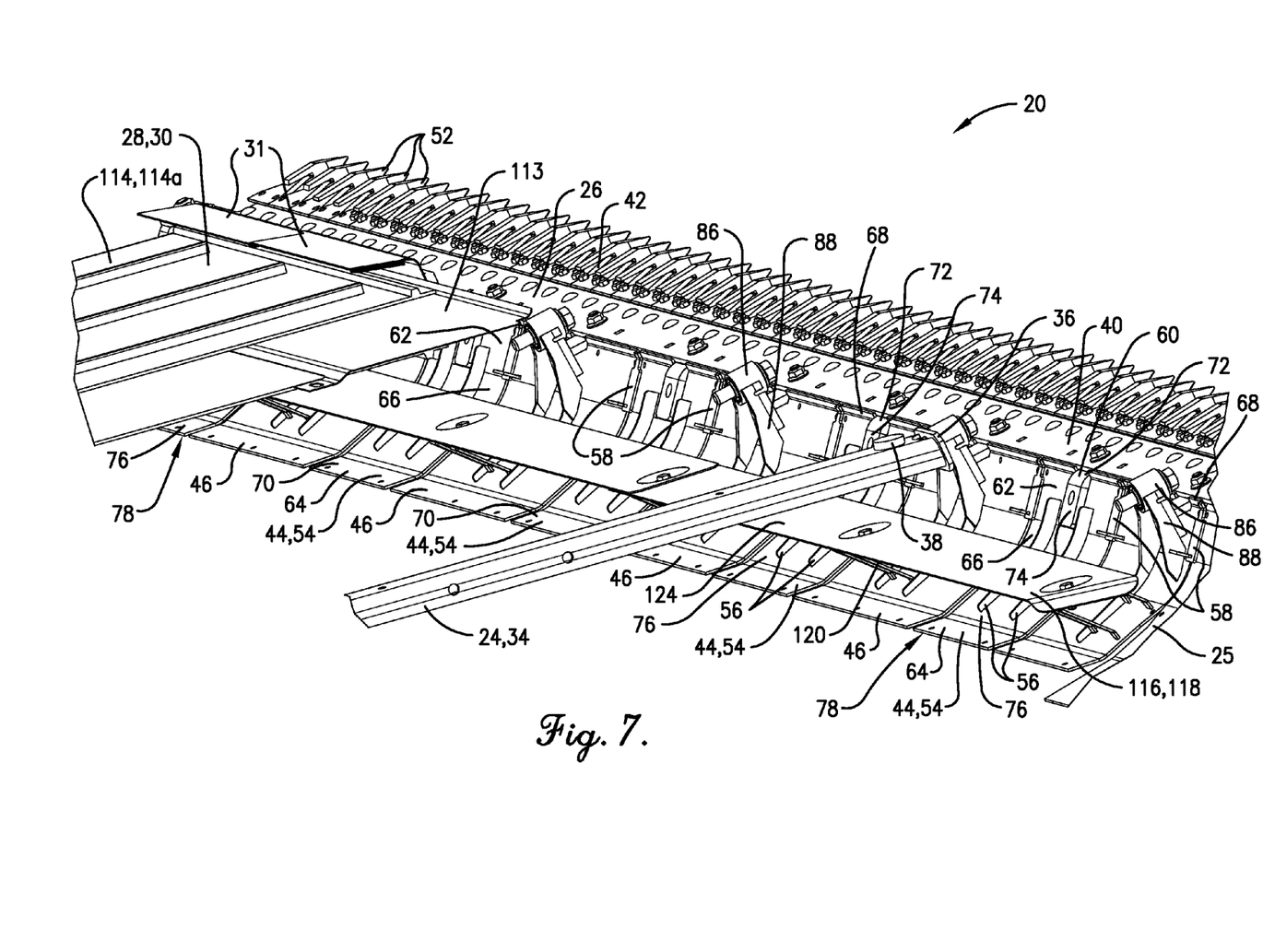
FIG. 7 is a fragmentary rear perspective of the harvesting header shown in FIG. 6, with multiple draper arm assemblies and belt guards being removed and portions of the draper belt and upper run support panels removed to depict the lower belt run support assembly and the cutterbar assembly.

Turning initially to FIGS. 6 and 7, a harvesting header 20 is operable to be used with a powered combine (not shown) to harvest various crops. In particular, the header 20 is operable to sever crop in close proximity to the ground surface and to collect the severed crop material. At the same time, it has been found that the illustrated header 20 operates without accumulating harmful amounts of crop residue at critical locations in the header mechanism, particularly along the draper belts.

The harvesting header 20 broadly includes a header frame 22 (similar to header frame F), draper arm assemblies 24, end tilt arm assemblies 25 (similar to end tilt arm assembly E), a cutterbar assembly 26, a draper assembly 28, which includes side drapers 30 and center draper 32, and a belt guard assembly including a plurality of belt guards 31. The header 20 also includes a central collecting auger 33 and a reel (not shown) that extends the length of the header frame 22 and is operable to direct upstanding crop into the header 20. The illustrated cutterbar assembly 26 and draper assembly 28 are preferably flexible so that the header 20 is configured to closely follow an undulating ground contour. However, for some aspects of the present invention, one, more or all of the drapers could be substantially inflexible relative to the header frame 22.

With respect to the header frame 22, draper arm assemblies 24, end tilt arm assemblies 25, center draper 32, and belt guards 31, additional preferred features of these components are disclosed in the above-incorporated '671 patent.

Turning to FIGS. 6-9, the draper arm assemblies 24 preferably include pivot arms 34 that are spaced laterally along and pivotally mounted to the header frame 22 for pivotal movement about a lateral pivot arm axis. The pivot arms 34 extend along the fore-and-aft direction to present a front end 36, with a spacer 38 being mounted on top of the pivot arm 34 adjacent the front end 36. As will be discussed, each of the pivot arms 34 is attached to a corresponding skid.

The cutterbar assembly 26 preferably includes a cutterbar 40, sickle assembly 42, and skids 44,46. The illustrated cutterbar 40 comprises a unitary, flexible metal strip and extends laterally along the length of the header. The cutterbar 40 is attached to and supports the sickle assembly 42.

The sickle assembly 42 comprises a split sickle that includes a pair of flexible sickle bars 48 and knives 50 that are attached to and spaced along the length of the flexible sickle bars 48. The sickle assembly 42 also includes knife guards 52 attached to the cutterbar 40, with the sickle bars 48 and knives 50 being operable to slide in a reciprocating manner relative to the cutterbar 40 and flex with the cutterbar 40. The sickle bars 48 preferably reciprocate in opposite directions relative to one another. However, it is within the scope of the present invention for the cutterbar assembly 26 to include a single continuous sickle bar. Additional features of the sickle assembly 42 and the sickle drive mechanism are disclosed in the above-incorporated '671 patent.

The skids 44,46 are configured to slide along the ground and thereby support the cutterbar 40 so that the cutterbar assembly 26 can travel in close proximity to the ground surface. The skids 44 each preferably include a skid plate 54, a pair of reinforcing ribs 56, end connectors 58, and a central bracket 60. The skid plate 54 preferably includes a cutterbar-supporting forward section 62 and a ground-engaging aft section 64 (see FIG. 7). The sections 62,64 are preferably formed as part of a unitary plate structure, with the sections 62,64 being joined along a laterally extending bend 66. However, it is also within the scope of the present invention where the sections 62,64 comprise separate plate elements that are fastened together. Preferably, the sections 62,64 are arranged so that the forward section 62 presents an angle θ1 relative to a normal direction of travel T along the ground and the aft section 64 presents an angle θ2 relative to the normal direction of travel T, where angle θ1 is greater than angle θ2 (see FIG. 9). The skid plate 54 also includes an upright section 68 that is attached to and angled relative to the forward section 62 (see FIG. 9). The skid plate 54 further includes a rearwardmost section 70 that is attached to and angled relative to the aft section 64. For some aspects of the present invention, the skid plate 54 could be alternatively configured without departing from the scope of the present invention.

The bracket 60 is elongated and unitary and presents forward and aft portions 72,74 that are angled relative to one another. The aft portion 74 is attached to the forward section 62 of the skid plate 54 and the forward portion 72 is attached to the cutterbar 40. Thus, the bracket 60 preferably interconnects the skid plate 54 and cutterbar 40 so that the skid plate 54 presents upper and lower surfaces 76,78.

The ribs 56 are also elongated and unitary and present fore and aft ends, with the ribs 56 presenting a height dimension that varies along the length of the rib 56. The ribs 56 are attached to the upper surface 76 of the skid plate 54 along a lower edge of the ribs. Thus, the ribs 56 serve to restrict flexing between the forward and aft sections 62,64. Preferably, the ribs 56 are welded to the skid plate 54, but could be attached thereto by other suitable means, e.g., where the ribs 56 are attached with fasteners.

Figure 9:
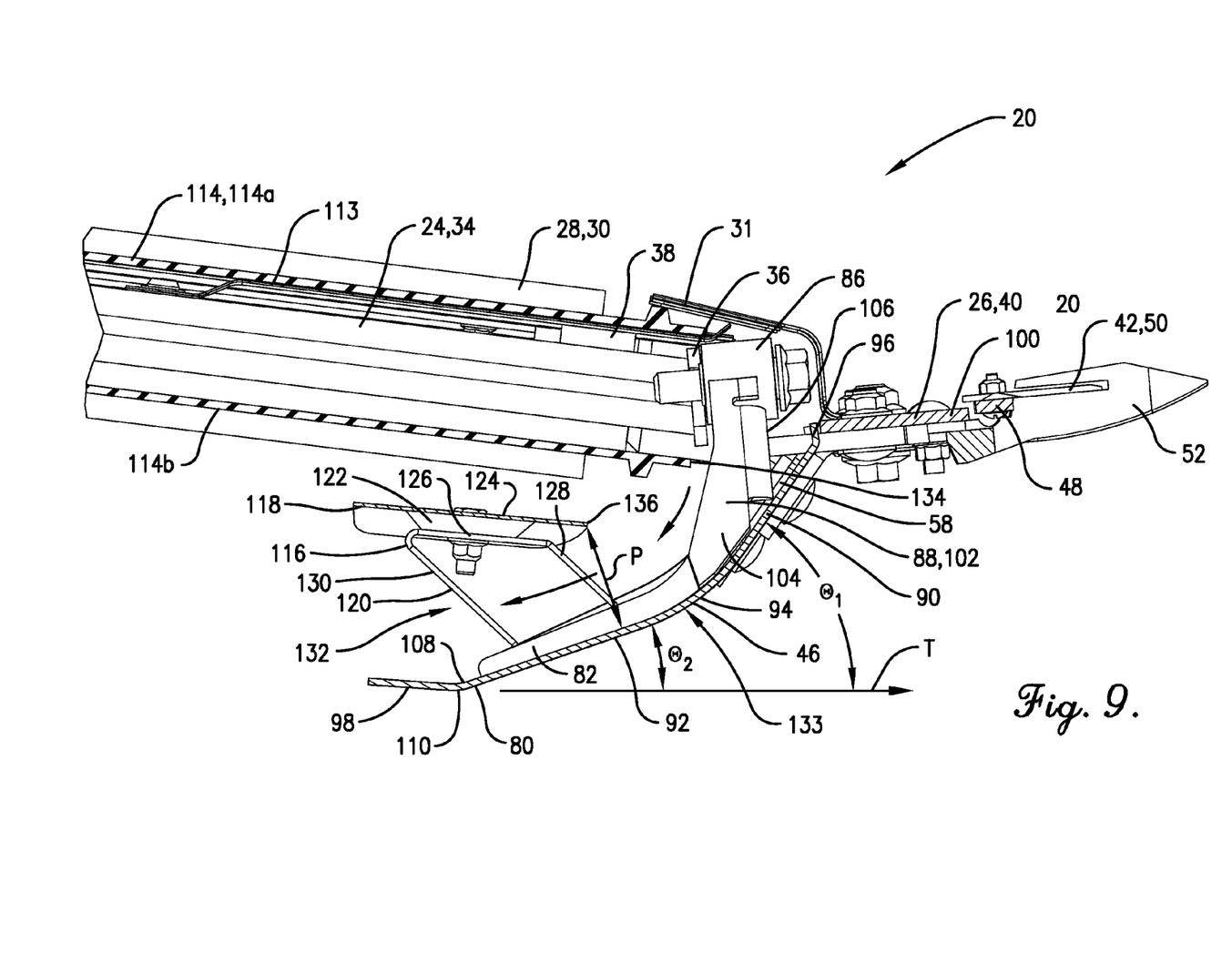
FIG. 9 is a fragmentary side elevation of the harvesting header shown in FIGS. 6-8, showing the cutterbar assembly and draper assembly cross sectioned to show a skid of the cutterbar assembly with the lower run support assembly mounted thereto, with the lower run support assembly and skid cooperatively defining a residue opening that permits crop residue to pass from the draper belt along the skid.
Figure 10:
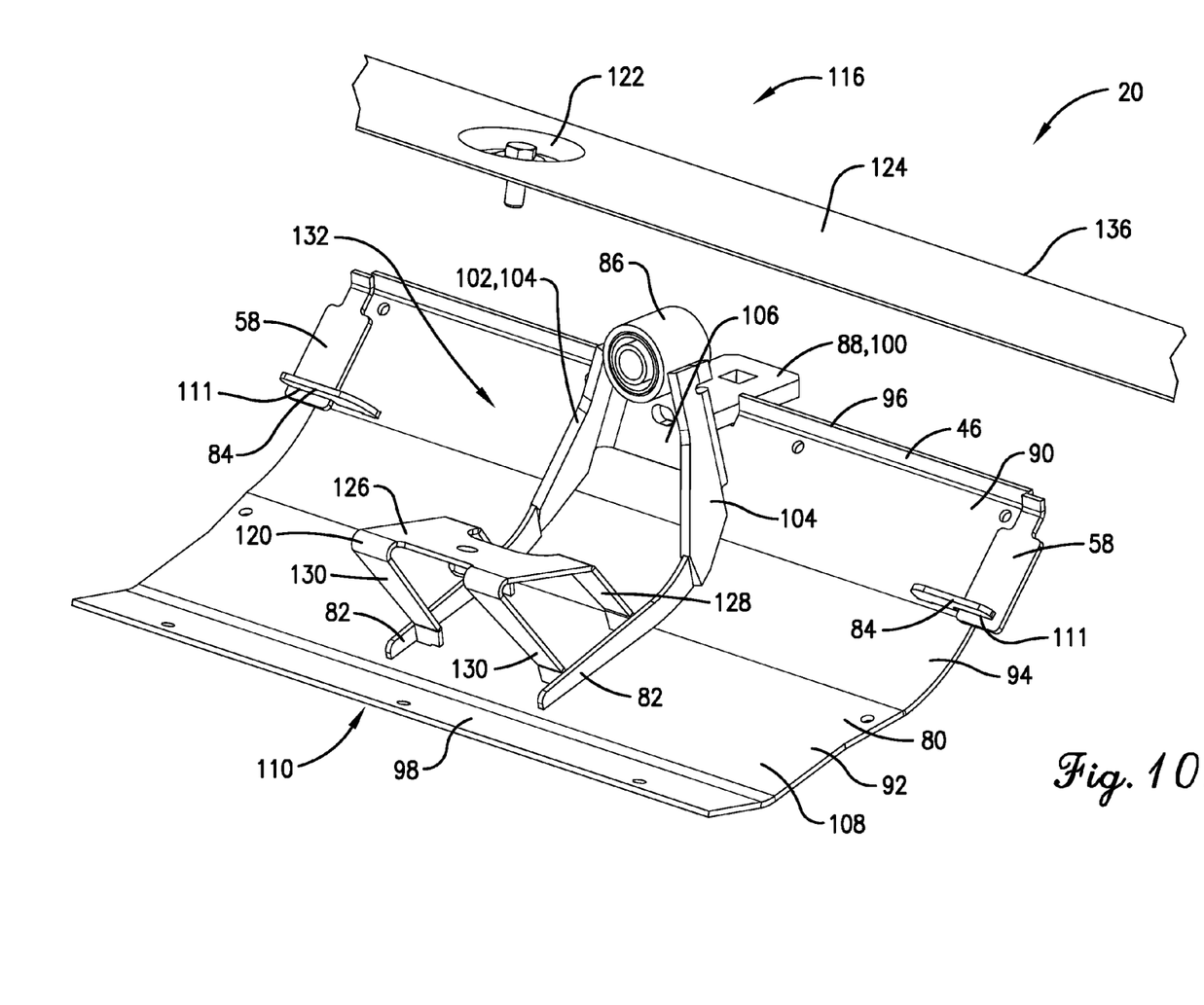
FIG. 10 is a fragmentary rear perspective of the harvesting header shown in FIGS. 6-9, showing the skid of the cutterbar assembly and a lower run support panel exploded from a platform of the lower run support assembly.

Turning to FIGS. 7, 9, and 10, the skids 46 each preferably include a skid plate 80, a pair of reinforcing ribs 82, end connectors 84, a bearing 86, and a central bracket 88. Similar to skid plate 54, the skid plate 80 preferably includes a cutterbar-supporting forward section 90 and a ground-engaging aft section 92. The sections 90,92 are preferably formed as part of a unitary plate structure, with the sections 90,92 being joined along a laterally extending bend 94. However, it is also within the scope of the present invention where the sections 90,92 comprise separate plate elements that are fastened together. Preferably, the sections 90,92 are arranged so that the forward section 90 presents the angle θ1 relative to the ground G and the aft section 92 presents the angle θ2 relative to the ground G. The skid plate 80 also includes an upright section 96 that is attached to and angled relative to the forward section 90. The skid plate 80 further includes a rearwardmost section 98 that is attached to and angled relative to the aft section 92. For some aspects of the present invention, the skid plate 80 could be alternatively configured without departing from the scope of the present invention.

The bracket 88 is elongated and unitary and presents forward and aft portions 100,102 that are attached to one another. The aft portion 102 includes upright sides 104 and a central web 106 that extends laterally between and interconnects the sides 104. The forward portion 100 is attached to and projects forwardly of the central web 106 along a fore-and-aft direction.

The bracket 88 preferably interconnects the skid plate 80 and cutterbar 40 so that the skid plate 80 presents upper and lower surfaces 108,110. In particular, the forward portion 100 is preferably attached to the cutterbar 40 with conventional fasteners.

The ribs 82 are also elongated and unitary and present fore and aft ends, with the ribs 82 presenting a height dimension that varies along the length of the rib 82. The ribs 82 are attached to the upper surface 108 of the skid plate 80 along a lower edge of the ribs. Preferably, the ribs 82 are welded to the skid plate 80, but could be attached thereto by other suitable means, e.g., where the ribs 82 are attached with fasteners. For some aspects of the present invention, the skids 44,46 could have an alternative shape and/or configuration without departing from the scope of the present invention.

The illustrated skids 44,46 are preferably positioned in an alternating arrangement where each pair of adjacent skids 44 has a skid 46 located therebetween and each pair of adjacent skids 46 has a skid 44 located therebetween. The skids 44,46 are shiftably interconnected by slidably positioning each end connector 58 in a corresponding slot 111 formed by the skid plate 80 and the respective end connector 84 (see FIG. 10). Thus, each pair of engaged connectors 58,84 cooperatively form a joint that preferably permits relative sliding movement and relative pivotal movement between the corresponding adjacent skids.

The skids 44,46 are preferably attached to and move with the draper arm assemblies 24. In particular, the skids 46 are each preferably attached to a corresponding pivot arm 34 by attaching the bearing 86 to the front end 36 with a bolt. In this manner, the skid 46 is pivotally mounted to the pivot arm 34 so as to be pivotal relative to the pivot arm 34 about a longitudinal arm axis. Thus, the pivot arms 34 also serve to support the skids 44 and the cutterbar assembly 26.

Again, the draper assembly 24 preferably includes side drapers 30 and center draper 32. Each side draper 30 broadly includes oppositely spaced inboard and outboard rollers 112, front and rear upper run support panels 113, a side draper belt 114, and a belt tensioning mechanism (not shown).

Each of the rollers 112 is rotatably mounted to a corresponding draper arm assembly 24. The rollers 112 are preferably mounted so as to pivot with the respective draper arm assemblies 24 about the lateral arm pivot axis. Additional features of a side draper with an exemplary arrangement of draper belt rollers is disclosed in U.S. Pat. No. 7,971,419, issued Jul. 5, 2011, entitled DRAPER BELT SUPPORT PANELS FOR FLEXIBLE DRAPER HEADER.

Figure 8:
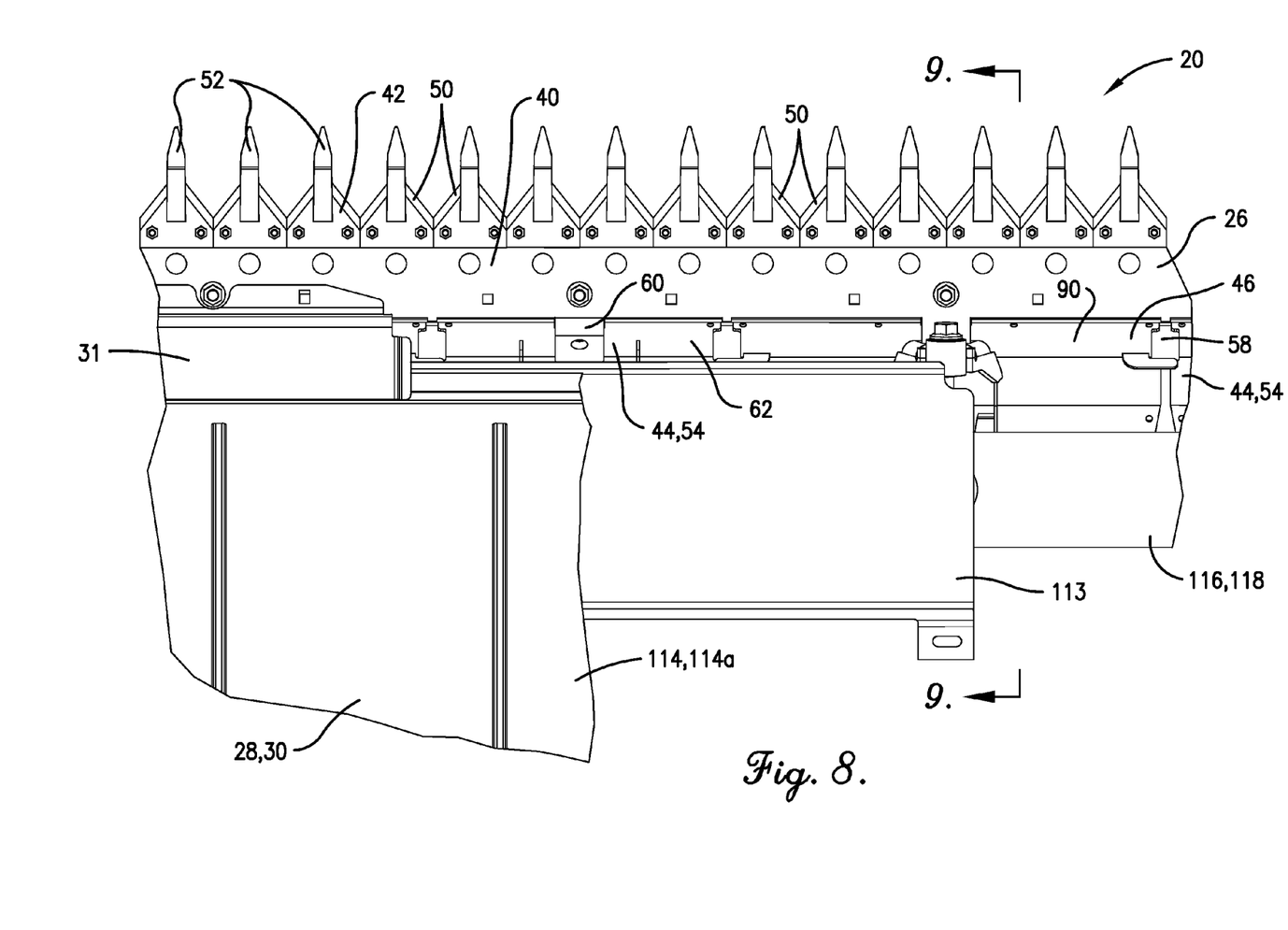
FIG. 8 is a fragmentary top view of the harvesting header shown in FIGS. 6 and 7, with belt guards being removed and portions of the draper belt and upper run support panels being removed to show the upper and lower run support panels positioned relative to the cutterbar assembly.

Turning to FIGS. 7-9, the upper run support panels 113 are preferably elongated metal strips that extend laterally between the rollers 112. The upper run support panels 113 are cooperatively supported by respective draper arm assemblies 24 and serve to evenly support the weight of the side draper belt 114 and any severed crop material on the side draper belt 114. The illustrated side draper belt 114 is a substantially endless belt that is particularly configured for conveying the severed crop material toward the center draper. The side draper belt 114 is rotatably mounted to surround the respective rollers 112 and the corresponding draper arm assemblies 24. The leading edge of the draper belt 114 is covered by belt guards 31, with the belt guards 31 extending from the cutterbar assembly 26 to a location adjacent the leading edge.

The side draper belt 114 presents opposite endmost margins defined by the rollers 112. Furthermore, the side draper belt 114 presents upper and lower runs 114a,b, with the upper run 114a extending over the upper run support panels 113 so that the panels 113 restrict the upper run 114a from sagging. The lower run 114b of the side draper belt 114 extends below the panels 113. The outboard roller 112 is powered by a drive (not shown), with the outboard roller 112 driving the side draper belt 114 so that the upper run 114a of the side draper belt 114 moves inwardly toward the center draper. While the illustrated embodiment includes left and right side drapers 30 separated by a center draper, it is within the scope of the present invention, for at least some aspects of the present invention, where an alternative conveyor mechanism is used. For instance, multiple end-to-end side drapers could be used to convey crop material.

The header 20 also includes a lower run support assembly 116 associated with each side draper. Each lower run support assembly 116 is operable to support the lower run 114b when part of the lower run 114b sags from the tensioned belt condition as depicted (i.e., the lower run is not depicted as sagging). It will be appreciated that the tensioned draper belt 114 loses tension over time. Thus, as the belt loses tension, a central portion of the lower run 114b can sag below the depicted position of the lower run 114b. As the lower run sags, the lower run support assembly 116 is operable to engage the sagging belt run.

The lower run support assembly 116 preferably includes lower run support panels 118 and platforms 120. The panels 118 each include an elongated metal strip that extends between opposite ends thereof. The panels 118 each present standoffs 122 formed in the metal strip and spaced along the length of the strip. The panels 118 also present an upper support surface 124.

The illustrated panels 118 are preferably arranged in a general end-to-end overlapping relationship (see FIG. 7). In this manner, the panels 118 preferably extend continuously from a location adjacent the inboard roller 112 to a location adjacent the outboard roller 112. However, for some aspects of the present invention, the lower run support assembly 116 could present one or more locations between the rollers where the lower run 114b is not supported by a panel 118. The panels 118 are preferably spaced entirely rearwardly of the belt guards 31. Furthermore, the panels 118 are preferably spaced entirely rearwardly of the leading edge of the draper belt 114 so that any crop residue from the draper belt 114 is restricted from falling onto the panels 118.

Preferably, platforms 120 are used to position and support the panels 118 below the lower run 114b and over the skids 44,46. Each platform 120 preferably includes a top 126, forward legs 128, and aft legs 130, with the legs 128,130 being attached to and depending from the top 126.

In the illustrated embodiment, the platform 120 is attached to a corresponding skid 46. In particular, the lower ends of legs 128,130 are preferably attached to the aft section 92 so that the legs 128,130 project upwardly and rearwardly from the aft section 92. Furthermore, the platform 120 is preferably positioned laterally between a corresponding pair of ribs 82.

The panels 118 are attached to corresponding platforms 120 with removable fasteners. Thus, the panels 118 are preferably mounted to and supported by respective skids 46. Furthermore, as the cutterbar 40 and skids move with the terrain as the header is advanced, the panels 118 generally move and flex with the skids 46. However, it is within the ambit of the present invention where the illustrated panels 118 are mounted so as to be supported by structure other than skids 46. For instance, structure other than pivot arms 34 could be mounted to the header frame 22 to extend forwardly to support the panels 118 above the ground.

The panels 118 are preferably positioned so that the panels 118 and skids 44,46 cooperatively present a residue opening 132 therebetween. The residue opening 132 extends from an entrance 133 adjacent a forward edge 134 of the lower run 114b and generally below the panels 118 to a location adjacent the rearwardmost sections 70,98 (see FIG. 9). The illustrated opening 132 is preferably configured so that any crop residue falling onto the skids 44,46 is allowed to pass rearwardly along the upper surfaces 76,108 of the skids (as indicated by the arrows in FIG. 9) and beyond the rearwardmost sections 70,98.

The panels 118 are preferably positioned so that a forward margin 136 of the panels 118 is spaced rearwardly from the upright sections 68,96 of the skids to define a longitudinal panel spacing dimension (measured in a fore-and-aft direction). The longitudinal panel spacing dimension is preferably in the range of about three (3) to seven (7) inches. Most preferably, the longitudinal panel spacing dimension is about five (5) inches.

The panels 118 are also preferably mounted relative to the skids so that the opening 132 has a minimum cross-sectional dimension P measured between the panel 118 and the skid. The minimum cross-sectional dimension P preferably ranges from about one (1) inch to about four (4) inches. More preferably, the minimum cross-sectional dimension P is about two (2) inches.

In use, the illustrated header construction permits crop residue to pass efficiently in the rearward direction along the upper surfaces of the skids. As the header 20 is advanced along the ground to harvest the crop, severed crop material passes over the cutterbar assembly 26 onto the draper assembly 28, with some of the crop material being conveyed by the side drapers 30 onto the center draper 32. As the header 20 continues to advance and crop material is conveyed, crop residue can collect along the leading edge of the side drapers 30. The crop residue can then fall from the leading edge of the side drapers 30, or perhaps other locations adjacent thereto, onto the skids 44,46. Header movement and vibration urges the crop residue to travel rearwardly along the skids 44,46 so that crop residue can be deposited beyond the rear of the skid and/or to either side of the skid. In this manner, the illustrated arrangement restricts crop residue from collecting to an extent where the crop residue on the skids hinders normal belt operation.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A harvesting header operable to harvest crop, said harvesting header comprising:
   a header frame;
   a flexible cutterbar assembly mounted to the header frame to extend lengthwise in a lateral direction relative to the normal direction of travel of the header,
   said cutterbar assembly including a plurality of skids configured to engage the ground and thereby cause flexing of the cutterbar assembly along the length thereof in response to changes in terrain as the header is advanced; and
   a draper assembly including an endless flexible draper belt configured to receive severed crop materials from the cutterbar assembly and convey the materials laterally,
   said draper belt presenting laterally endmost margins, with upper and lower runs extending between the margins; and
   a lower run support assembly located below the lower run of the draper belt and at least partly over the skids,
   said lower run support assembly including a run support panel extending laterally along the lower run,
   said run support panel being spaced from the skids to define a residue opening therebetween through which any crop residue falling onto the skids is permitted to pass,
   said residue opening being defined under the run support panel so that crop residue passes underneath the run support panel and above the skids.

2. The harvesting header as claimed in claim 1,
   said draper belt being supported on the header frame to flex with the cutterbar assembly as changes in terrain are encountered.

3. The harvesting header as claimed in claim 2; and
   a plurality of laterally spaced apart pivotable support arms being attached to and cooperatively supporting the flexible cutterbar assembly,
   each of said support arms being pivotally coupled to the frame for swinging movement about a laterally extending axis,
   said draper belt being carried on multiple ones of the support arms so as to flex with the cutterbar assembly.

4. The harvesting header as claimed in claim 1,
   said lower run support assembly being attached to and supported by at least one of the skids.

5. The harvesting header as claimed in claim 4,
   said lower run support assembly including a plurality of upright legs spaced along the lower run,
   said legs interconnecting the run support panel and the at least one skid.

6. The harvesting header as claimed in claim 5,
   said legs sloping upwardly and rearwardly from the at least one skid.

7. The harvesting header as claimed in claim 4,
   said residue opening having a minimum cross-sectional dimension measured between the run support panel and the at least one skid,
   said minimum cross-sectional dimension being about two inches.

8. The harvesting header as claimed in claim 7,
   said skids having a forwardmost edge,
   said cutterbar assembly including a sickle assembly mounted to the skids adjacent the forwardmost edge,
   said run support panel presenting a forward margin,
   said forward margin being spaced rearwardly about five inches from the forwardmost edge.

9. The harvesting header as claimed in claim 8,
   said draper belt presenting laterally extending, spaced apart leading and trailing edges relative to the normal direction of header travel,
   said leading edge of the belt being spaced forward of the forward margin of the run support panel.

10. The harvesting header as claimed in claim 4,
    said skids each presenting a cutterbar-supporting forward section and a ground-engaging aft section,
    said run support panel being positioned substantially entirely above the ground-engaging aft section.

11. The harvesting header as claimed in claim 10,
    said lower run support assembly including a platform that is attached to the aft section of the at least one skid and supports the run support panel.

12. The harvesting header as claimed in claim 11,
    said platform presenting upper and lower ends, with the lower end being attached to the aft section of the at least one skid and the upper end being attached to the run support panel,
    said platform projecting upwardly and rearwardly from the lower end toward the upper end so that the run support panel is spaced upwardly and rearwardly relative to the at least one skid.

13. The harvesting header as claimed in claim 1, said draper belt presenting laterally extending, spaced apart leading and trailing edges relative to the normal direction of header travel, said run support panel being spaced entirely rearwardly from the leading edge of the draper belt.

14. The harvesting header as claimed in claim 13, a plurality of belt guards attached to and disposed along the cutterbar assembly to accommodate and move with the cutterbar assembly during flexing thereof, with each of the guards extending from the cutterbar assembly to a location adjacent the leading edge of the draper belt, said run support panel being spaced entirely rearwardly from the belt guards.

15. The harvesting header as claimed in claim 1, said skids each presenting a cutterbar-supporting forward section and a ground-engaging aft section, said skids each including a fore-and-aft rib extending between the forward and aft sections to restrict relative flexing between the forward and aft sections.

16. The harvesting header as claimed in claim 1; and a plurality of laterally spaced apart pivotable support arms being attached to and cooperatively supporting the flexible cutterbar assembly, each of said support arms being pivotally coupled to the frame for swinging movement about a laterally extending axis, said skids each including a mounting bracket, said mounting bracket being attached to a respective one of the support arms so as to be swingable with the one support arm about the laterally extending axis.

17. The harvesting header as claimed in claim 16, said mounting bracket being pivotally attached to the one support arm to pivot relative thereto about a fore-and-aft axis.

18. The harvesting header as claimed in claim 16, said skids each presenting a cutterbar-supporting forward section and a ground-engaging aft section, said skids each including a fore-and-aft rib extending between the forward and aft sections to restrict relative flexing between the forward and aft sections.

19. The harvesting header as claimed in claim 18, said mounting bracket and said rib being interconnected to cooperatively provide skid reinforcement structure that restricts relative pivotal movement between the forward and aft sections.

20. The harvesting header as claimed in claim 1, said run support panel presenting a forward margin that is spaced entirely from the skids so as to define an entrance to the residue opening.

* * * * *

UNITED STATES PATENT AND TRADEMARK OFFICE
CERTIFICATE OF CORRECTION

| | | |
|---|---|---|
| PATENT NO. | : 8,479,483 B1 | Page 1 of 1 |
| APPLICATION NO. | : 13/337996 | |
| DATED | : July 9, 2013 | |
| INVENTOR(S) | : Huseman et al. | |

It is certified that error appears in the above-identified patent and that said Letters Patent is hereby corrected as shown below:

On the title page item (75), the state of residence for the inventor Brian Heath is listed as "IN" and should be changed to --IL--.

Signed and Sealed this
Eleventh Day of March, 2014

Michelle K. Lee
*Deputy Director of the United States Patent and Trademark Office*